Patented Feb. 6, 1951

2,540,093

UNITED STATES PATENT OFFICE 2,540,093

THIENYLTHIOLESTERS IN LUBRICATING COMPOSITIONS

John W. Brooks, Wenonah, N. J., assignor to Socony-Vacuum Oil Company, Incorporated, a corporation of New York No Drawing. Application July 21, 1948, Serial No. 40,002

11 Claims. (Cl. 252—48.6)

This invention relates to a group of new chemical compounds, namely, the thienylthiolesters. More specifically, the present invention is directed to an improvement of various mineral oil fractions normally susceptible to the deleterious effects of oxidation by incorporation therein of a minor proportion of a thienylthiolester sufficient to stabilize the oil against oxidation.

As is well known to those familiar with the art, substantially all of the numerous fractions obtained from mineral oils and refined for their various uses are susceptible to oxidation. The susceptibility of an oil fraction to oxidation and the manner in which oxidation manifests itself within the oil varies with the type and degree of refinement to which the oil has been subjected and with the conditions under which it is used or tested; that is, the products formed in an oil fraction as a result of oxidation and the degree to which they are formed depend on the extent to which the various unstable constituents or constituents which may act as oxidation catalysts have been removed by refining operations and also upon the conditions of use.

The present invention is predicated upon the discovery that a group of new chemical compounds, the thienylthiolesters, greatly improve the oxidation characteristics of mineral oil fractions by incorporation therein of minor proportions of these compounds. It has been found that by the addition of a thienylthiolester to a viscous mineral oil fraction, the development of undesirable products and properties such as acid, sludge, discoloration, and corrosiveness toward alloy-bearing metals, normally encountered under conditions of use, has been substantially inhibited.

The compounds of this invention may be designated by the general formula:

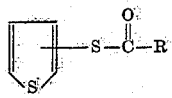

where R represents an alkyl, aryl, or heterocyclic group.

The thiol-sulfur linkages of the above compounds may be attached to either the 2-position or the 3-position of the thiophene ring. In the former instance, the compound will be a 2-thienylthiolester and in the latter instance, a 3-thienylthiolester. It is also contemplated that the thiophene ring may have one or more of its nuclear hydrogen atoms replaced by other substituent groups, such as alkyl, alkoxy, aryl, alicyclic, aralkyl, halogen, and the like.

The thienylthiolesters described above may suitably be prepared by the action of a thiophenethiol with a carboxylic acid, other than formic acid, or an acyl halide. Under such conditions, the hydrogen of the mercapto group in the thiophenethiol reacts with the hydroxy group of the carboxylic acid or with the halogen of the acyl halide employed to split out water or hydrogen halide, respectively, and to yield the desired thienylthiolester. In general, the temperature at which the above reaction is carried out will be between about 0° C. and about 120° C. It will be understood that the particular conditions of temperature employed will depend in part on the nature of the carboxylic acid or acyl halide employed. The aforementioned reactant of thiophenethiol may be prepared by any one of numerous procedures heretofore described in the literature. Thus, 3-thiophenethiol may be produced by the process described in Chem. Inds. 60, 593-5, 620 (1947) and 2-thiophenethiol by the procedure described in Ber. Dtsch. Chem. Ges. 19, 1615 (1886) or in Ber. Dtsch. Chem. Ges. 20, 1756 (1887).

The above reactions will usually be carried out with the molar ratio of thiophenethiol to carboxylic acid or acyl halide between about 1 to 1 and about 6 to 1. Generally, since the above reactions are to some extent reversible, it is desirable when using a carboxylic acid to have a water entrainer present so that water formed during the course of reaction is removed, thus allowing the esterification to go to completion. Similarly, when an acyl halide is employed as the reactant, it is desirable, although not essential, to have present in the reaction mixture a compound capable of taking up the hydrogen halide released during the course of the reaction. A suitable compound for this purpose is pyridine.

The nature of the alkyl, aryl, or heterocyclic group present in the thienylthiolesters described herein may be either saturated or unsaturated and may contain various substituents such as those introduced by halogenation, nitration, alkylation, sulfonation, and the like. The alkyl group may be either straight-chained or branch-chained. The aryl or heteroyclic substituents may be either derived from mononuclear or polynuclear compounds. Representative of the alkyl, aryl, and heterocyclic thienylthiolesters of this invention are those produced upon reacting thiophenethiol with acyl halides, such as acetyl chloride, butyryl chloride, stearyl chloride, benzoyl chloride, furoyl chloride, phenylacetyl chloride, naphthoyl chloride, m-butyl benzoyl chloride, etc., or those produced upon reacting thiophenethiol with carboxylic acids, such as acetic acid, propionic acid, benzoic acid, furoic acid, phenylacetic acid, naphthoic acid, m-butyl benzoic acid, etc. This list, of course, is not to be construed as limiting since the present invention contemplates the use of alkyl, aryl, and heterocyclic acyl halides or carboxylic acids generally as reactants to synthesize the compounds of this invention. Those skilled in the art will readily recognize various other acyl halides or carboxylic acids which may be employed according to the above described procedure in preparing the compounds of this invention.

The preparation of the compounds of the present invention may be illustrated by the following examples which are given by way of illustration and not intended to be a limitation upon the scope of the invention.

EXAMPLE I

Preparation of 3-thienylthiolacetate

Two hundred thirty-two grams (2 moles) of 3-thiophenethiol were mixed with 157 grams (2 moles) of acetyl chloride. The resulting mixture was heated slowly to a temperature of 105° C. over a period of 2½ hours. Hydrogen chloride evolution was complete at this time. The reaction product mixture was then washed with aqueous sodium carbonate solution, then water-washed, dried over anhydrous magnesium sulfate, and distilled under a reduced pressure. A product of 3-thienylthiolacetate was distilled from the reaction mixture at a temperature of 84–86° C. at a pressure of one millimeter of mercury. The sulfur analysis of this compound was 40.5 per cent, which is in complete agreement with the theoretical sulfur content for 3-thienyl-thiol acetate.

This compound is hereinafter referred to as compound I.

EXAMPLE II

Preparation of 3-thienylthiolbenzoate

One hundred forty grams (1 mole) of benzoyl chloride were added over a period of 2 hours to a flask containing 116 grams (1 mole) of 3-thiophenethiol, 400 cc. of benzene and 80 grams (1 mole) of pyridine at such a rate that the temperature was maintained in the range of 35–40° C. The resulting reaction mixture was filtered to remove pyridine hydrochloride and then topped to a pot temperature of 100° C. under a pressure of 15 millimeters of mercury. The resulting residue of 3-thienylthiolbenzoate was recrystallized from cyclohexane to yield a yellow solid having a melting point of 69–70° C. The sulfur analysis of this compound was 28.98 per cent, the theoretical sulfur content being 29.09 per cent.

This compound is hereinafter referred to as compound II.

EXAMPLE III

Preparation of 3-thienylthiolfuroate

Two hundred thirty-two grams (2 moles) of 3-thiophenethiol, 500 cc. of benzene, and 120 grams of pyridine were placed in a flask and 196 grams (1½ mole) of furoyl chloride were added over a period of 2 hours at such a rate that the reaction temperature was maintained in the range of 40–50° C. The mixture was thereafter agitated for 2 hours at a temperature of 70° C. The mixture was filtered to remove resulting pyridine hydrochloride. The filtrate obtained was washed with 15 per cent aqueous sodium hydroxide solution and then with water. The resulting mixture was thereafter dried over anhydrous magnesium sulfate and topped to a pot temperature of 100° C. under a pressure of 200 millimeters of mercury to remove benzene. The residue of 3-thienylthiolfuroate was recrystallized from cyclohexane in 80 per cent yield and was found to have a melting point of 51–52° C. The sulfur analysis of this compound was 30.46 per cent, the theoretical sulfur content being 30.48 per cent.

This compound is hereinafter referred to as Compound III.

The thienylthiolesters of this invention have been found to be valuable as additives in the stabilization of petroleum oil fractions, particularly in inhibiting the development of undesirable products and properties such as acid, sludge, discoloration, and corrosiveness toward alloy-bearing metals, normally encountered under conditions of use. Thus, it is well known that motor oils, especially those refined by certain solvent extraction methods, tend to oxidize when submitted to high temperatures and to form products that are corrosive to metal bearings. This corrosive action may be quite severe with certain bearings, such as those having the corrosion susceptibility of cadmium-silver alloys, and may cause their failure within a comparatively short time.

The compounds of this invention are particularly effective in the stabilization of transformer oils and technical white oils, which are of a highly refined character and substantially free from unsaturated hydrocarbons and resinous compounds. Oils of this type are commonly made by refining petroleum distillates of the requisite viscosity by treatment with large quantities of sulfuric acid, including fuming sulfuric acid, followed by neutralization and clay filtration or redistillation. So far as the present invention is concerned, however, the method by which the highly refined character is imparted to the oil is unimportant.

The highly refined viscous petroleum oils, although generally stable against oxygen at ordinary temperatures, tend to absorb atmospheric oxygen when heated, particularly when in contact with catalytic metals such as copper. The result of such oxidation is the production of acid compounds soluble in the oils. The oils thereby become unsuitable for their adapted purposes and must be purified or replaced.

The effectiveness of the compounds of this invention in stabilizing highly refined mineral oils against the deleterious effects of oxidation may be evaluated not only by actual use of the stabilized oils in transformers and machinery but also by a laboratory test commonly known as the "German tar test," which has been found to give results comparable in degree with the results obtained in actual use. In accordance with this method, a sample of 150 grams of the oil is maintained at a temperature of 120° C. and oxygen gas is bubbled through it slowly for 70 hours at a rate of 2 liters per hour. The sample is then titrated with alcoholic potash and the neutralization number of the oil thus determined. The neutralization number varies directly with the susceptibility of the oil to acid formation under the conditions of the test.

In the test specifically described herein, the base oil used was a highly refined oil which had been prepared by treating a Coastal distillate with 40 pounds of 98 per cent sulfuric acid and 180 pounds of 103 per cent oleum per barrel (400 pounds) of oil, followed by a clay percolation. It had a specific gravity of 0.871, a flash point of 310° F. and a Saybolt Universal Viscosity of 69 seconds at 100° F. Such an oil containing no additive, when subjected to the aforementioned test, was readily susceptible to oxidation and developed a neutralization number of about 20. The same oil containing a minor proportion of a thienylthiolester, when tested, had an unexpectedly low neutralization number, indicating the non-susceptibility of the stabilized oil toward oxidation. The following data are indicative of the effectiveness of the compounds of this invention in inhibiting the development of acidity in the mineral oil when the same is subjected to the above described oxidation conditions:

| Compound Added | Per Cent of Compound | Neutralization Number |
| --- | --- | --- |
| None | | 20 |
| I | 0.2 | 0.01 |
| II | 0.2 | 0.01 |
| III | 0.1 | 3.7 |

From the foregoing test results, it will be evident that the thienylthiolesters of this invention are effective stabilizing agents for petroleum lubricating oil fractions. The quantity of compound employed as stabilizer to inhibit the undesirable effects of oxidation in the oil may be varied, depending upon the character of the oil and the severity of the conditions to which it is exposed. Ordinarily, the compositions will be added to mineral oil fractions in an amount ranging from about 0.1 to about 5 per cent but may be added in amounts up to 10 per cent by weight in some instances.

It is to be understood that the examples, procedures, and oil compositions described above are illustrative only and are not to be construed as limiting the scope of this invention thereto. Thus, in addition to the specific compounds set forth above, other thienylthiolesters falling within the scope of the above disclosed general formula may similarly be employed as additives in improving the properties of viscous mineral oil fractions normally subject to deterioration under oxidizing conditions.

I claim:

1. An improved mineral oil composition comprising a major proportion of mineral oil and in admixture therewith a minor proportion, less than about 10 per cent by weight but sufficient to stabilize said oil against the deleterious effects of oxidation, of a compound having the general formula:

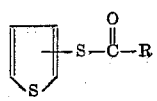

where R is a substituent selected from the group consisting of alkyl, aryl, and heterocyclic radicals.

2. An improved mineral oil composition comprising a major proportion of mineral oil and a minor proportion of between about 0.1 and about 5 per cent by weight, sufficient to stabilize said oil against the deleterious effects of oxidation, of a compound having the general formula:

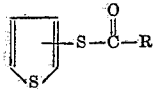

where R is a substituent selected from the group consisting of alkyl, aryl, and heterocyclic radicals.

3. An improved mineral oil composition comprising a major proportion of mineral oil and in admixture therewith a minor proportion, less than about 10 per cent by weight but sufficient to stabilize said oil against the deleterious effects of oxidation, of a compound having the general formula:

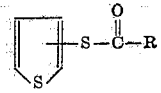

where R is an alkyl radical.

4. An improved mineral oil composition comprising a major proportion of mineral oil and in admixture therewith a minor proportion, less than about 10 per cent by weight but sufficient to stabilize said oil against the deleterious effects of oxidation, of a compound having the general formula:

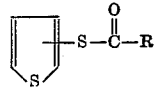

where R is an aryl radical.

5. An improved mineral oil composition comprising a major proportion of mineral oil and in admixture therewith a minor proportion, less than about 10 per cent by weight but sufficient to stabilize said oil against the deleterious effects of oxidation, of a compound having the general formula:

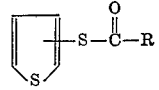

where R is a heterocyclic radical.

6. An improved mineral oil composition comprising a major proportion of mineral oil and in admixture therewith a minor proportion, less than about 10 per cent by weight but sufficient to stabilize said oil against the deleterious effects of oxidation, of 3-thienylthiolacetate.

7. An improved mineral oil composition comprising a major proportion of mineral oil and in admixture therewith a minor proportion, less than about 10 per cent by weight but sufficient to stabilize said oil against the deleterious effects of oxidation, of 3-thienylthiolbenzoate.

8. An improved mineral oil composition comprising a major proportion of mineral oil and in admixture therewith a minor proportion, less than about 10 per cent by weight but sufficient to stabilize said oil against the deleterious effects of oxidation, of 3-thienylthiolfuroate.

9. An improved mineral oil composition comprising a major proportion of a mineral oil and in admixture therewith a minor proportion, less than about 10 per cent by weight but sufficient to stabilize said oil against the deleterious effects of oxidation, of a 3-thienylthiolester having the general formula:

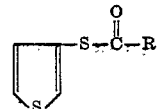

where R is an alkyl radical.

10. An improved mineral oil composition comprising a major proportion of a mineral oil and in admixture therewith a minor proportion, less than about 10 per cent by weight but sufficient to stabilize said oil against the deleterious effects of oxidation, of a 3-thienylthiolester having the general formula:

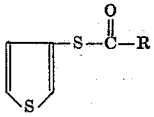

where R is an aryl radical.

11. An improved mineral oil composition comprising a major proportion of a mineral oil and in admixture therewith a minor proportion, less than about 10 per cent by weight but sufficient to stabilize said oil against the deleterious effects of oxidation, of a 3-thienylthiolester having the general formula:

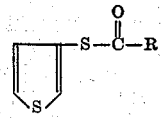

where R is a heterocyclic radical.

JOHN W. BROOKS.

REFERENCES CITED

The following references are of record in the file of this patent:

UNITED STATES PATENTS

| Number | Name | Date |
| --- | --- | --- |
| 2,073,841 | Humphreys et al. | Mar. 16, 1937 |
| 2,160,293 | Shoemaker et al. | May 30, 1939 |